(12) United States Patent
Schoenknecht et al.

(10) Patent No.: US 8,902,551 B2
(45) Date of Patent: Dec. 2, 2014

(54) INVERTER FOR AN ELECTRIC MACHINE AND METHOD FOR OPERATING AN INVERTER FOR AN ELECTRIC MACHINE

(75) Inventors: Andreas Schoenknecht, Renningen (DE); Axel Haas, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 13/638,150

(22) PCT Filed: Feb. 3, 2011

(86) PCT No.: PCT/EP2011/051527
§ 371 (c)(1),
(2), (4) Date: Dec. 17, 2012

(87) PCT Pub. No.: WO2011/120727
PCT Pub. Date: Oct. 6, 2011

(65) Prior Publication Data
US 2013/0114166 A1   May 9, 2013

(30) Foreign Application Priority Data
Apr. 1, 2010   (DE) .......................... 10 2010 003 595

(51) Int. Cl.
| H02H 3/00 | (2006.01) |
| H02P 29/02 | (2006.01) |
| B60L 3/00 | (2006.01) |
| H02H 7/10 | (2006.01) |
| B60L 11/12 | (2006.01) |

(52) U.S. Cl.
CPC .............. *H02H 7/10* (2013.01); *Y02T 10/7077* (2013.01); *H02P 29/021* (2013.01); *B60L 3/003* (2013.01); *Y02T 10/70* (2013.01); *B60L 11/12* (2013.01); *Y02T 10/642* (2013.01)
USPC .......................................................... 361/18

(58) Field of Classification Search
USPC .......................................................... 361/18
See application file for complete search history.

(56) References Cited

U.S. PATENT DOCUMENTS 4,020,360 A * 4/1977 Udvardi-Lakos ............... 307/66
4,611,159 A * 9/1986 Kurakake et al. ............. 318/803
(Continued)

FOREIGN PATENT DOCUMENTS

| DE | 3337088 | 5/1985 |
| DE | 10221081 | 11/2003 |

(Continued)

OTHER PUBLICATIONS

International Search Report for PCT/EP2011/051527, dated Jul. 5, 2012.

*Primary Examiner* — Stephen W Jackson
(74) *Attorney, Agent, or Firm* — Kenyon & Kenyon LLP

(57) ABSTRACT

An inverter for an electric machine, and a method for operating the inverter, has at least one output stage unit for producing a connection between the electric machine and a power supply network, a control unit for controlling the output stage unit, a supply unit independent of the power supply network for power supply of the output stage unit, at least one emergency operation control assigned to the output stage unit for controlling the output stage unit such that switching elements are switched into a short circuit operation, at least one emergency operation supply assigned to the output stage unit for generating a power supply from the power supply network, and a coordination control, which activates or deactivates the emergency operation control as a function of a status signal of the independent supply unit and a standby signal of the control unit.

11 Claims, 2 Drawing Sheets

(56) References Cited

U.S. PATENT DOCUMENTS

| | | | |
|---|---|---|---|
| 5,410,234 A * | 4/1995 | Shibata et al. | 318/700 |
| 6,239,566 B1 | 5/2001 | Tareilus et al. | |
| 6,264,005 B1 * | 7/2001 | Kang et al. | 187/290 |
| 7,023,168 B1 * | 4/2006 | Patel et al. | 318/757 |
| 7,619,864 B1 * | 11/2009 | Huang | 361/88 |
| 2007/0063661 A1 | 3/2007 | Galli et al. | |

FOREIGN PATENT DOCUMENTS

| | | |
|---|---|---|
| DE | 102006003254 | 7/2007 |
| DE | 102007020509 | 11/2008 |
| DE | 102009044944 | 3/2011 |
| EP | 1524761 | 4/2005 |

* cited by examiner

INVERTER FOR AN ELECTRIC MACHINE AND METHOD FOR OPERATING AN INVERTER FOR AN ELECTRIC MACHINE

CROSS REFERENCE TO RELATED APPLICATIONS

The present application is the national stage entry of International Patent Application No. PCT/EP2011/051527, filed on Feb. 3, 2011, which claims priority to Application No. DE 10 2010 003 595.5, filed in the Federal Republic of Germany on Apr. 1, 2010.

FIELD OF INVENTION

The present invention relates to an inverter for an electric machine as well as a method for operating an inverter for an electric machine.

BACKGROUND INFORMATION

Electric machines having inverters are used in hybrid vehicles, for example, where they are optionally operated in motor or generator operation. In motor operation the electric machine generates additional drive torque, which supports an internal combustion engine, for instance, in an acceleration phase, and in generator operation it generates electric power which is stored in an energy store, such as a battery or a Super-Cab. The type of operation and the power of the electric machine are set using the inverter.

Since comparatively high voltages must be provided in hybrid motor vehicles in order to be able to use the electric machine as a motor to drive the motor vehicle, methods are always provided for protecting the electrical network and the components electrically connected to the electrical network, which prevent permanent damage.

Thus, it is known that one may disconnect the electric energy store electrically from the network when a malfunction of the electric energy store is detected. If the electric machine is in generator operation at this point, the result is that the network voltage increases greatly, which is able to lead to the destruction of the output stages of the inverter.

To prevent this, European Application No. EP 1 524 761 A1 describes, for example, that one may switch the inverter to short circuit operation, in response to the exceeding of a specifiable hold-off voltage.

German Application No. DE 102 21 081 A1 describes an inverter for an electric machine, which includes a plurality of switching elements which are arranged in a bridge circuit, and which produce a connection between the electric machine and a battery. The switching elements built into the low-side branch of the inverter are ones that are conductive without a control voltage present, i.e., normally-on switching elements. That ensures that if the supply voltage is absent and the electric machine is rotating, the windings of the electric machine are short circuited and no overvoltages are able to occur.

German Application No. DE 10 2006 003 254 A1 describes a method for switching off an electric machine using pulse-controlled inverters in the case of interference that provides for minimizing undesired side effects during the switching off of the electric machine and to maximize the regular machine operation, in that the electric machine is first switched to a disconnect operation in which all the switches of the pulse-controlled inverter are open, and subsequently to a short-circuit mode, in which the switches connected to high potential are open and the switches connected to the low potential are closed.

German Application No. DE 10 2007 020 509 A1 describes a method for fault treatment for electric machines of a hybrid drive, in which it is first detected whether at least one operating parameter of the electric machine is greater than an associated operating parameter boundary value. If it is detected, in the process, that at least one operating parameter is greater than the associated boundary value, a supply connection of the electric machine is disconnected for a time interval assigned to the operating parameter and, after the expiration of the time interval, the supply connection is short-circuited to ground.

German Application No. DE 33 37 088 describes a device for the potential-free actuation of electronic switches of three-phase inverters using a transformer.

German Application No. DE 10 2009 044944 describes an inverter system having output stage units. In the fault case, the output stage units are actuated by an emergency operation control mechanism. The emergency operation control mechanism is supplied with power by an emergency operation supply.

SUMMARY

The inverter according to the present invention for an electric machine has at least one output stage unit for producing a connection between the electric machine and a power supply network, a control unit for controlling the at least one output stage unit, as well as a supply unit that is independent of the power supply network for the power supply of the output stage unit(s). Furthermore, at least one of the emergency operation controls assigned to the output stage unit(s) is provided to control the output stage unit(s). The control of the output stage unit(s) by the emergency operation control mechanism takes place so that switching elements within the output stage unit are switched to a short circuit operation. Furthermore, at least one coordination control assigned to the output stage unit(s) is provided which, as a function of a status signal of the independent supply unit and of a standby signal of the control unit activates or deactivates the emergency operation control mechanism, so that, during the activation of the emergency operation control mechanism, the switching elements are switched within the output stage unit to a short circuit operation.

The power supply network for supplying the electric machine is, for instance, a high-voltage traction network in a hybrid vehicle. This power supply network is connected to an energy store, for instance, a high-voltage battery. The supply unit independent of this is fed, for example, via the low-voltage vehicle network of a hybrid vehicle, and is used as the power supply of the output stage unit(s). The supply unit that is independent of the power supply network is particularly not connected galvanically to the power supply network. The output stage unit(s) each have at least one output stage, for instance, in the form of a power semiconductor circuit, and at least one output stage control mechanism. In a normal operation, the output stage control mechanism(s) each receive control specifications, which are then converted into suitable control signals for controlling the output stages. Moreover, at least one emergency operation control is provided for the output stage unit(s), for controlling the output stage unit(s) in an emergency.

Advantageously, by providing at least one emergency control that is activatable and deactivatable and assigned to the output stage unit(s), and checking the status signal of the independent supply unit and of the standby signal of the control unit using the coordination control, it is thus assured that, at any time, particularly the output stages of the inverter are able to be switched into a secure operating state, such as into a short circuit operation. During the turn-on transient or the turn-off transient of the inverter, or even in case of a malfunction of the control unit and/or the supply unit of the inverter, particularly overvoltages in the power supply network, which could lead to permanent damage of the output stages, may thus be avoided. Since the emergency operation control is designed to be activatable and deactivatable, switching over may be accomplished from emergency operation back to normal operation using the coordination control, as a function of the status signal of the independent supply unit and a standby signal of the control unit.

In one further refinement of the present invention, it is provided that the coordination control deactivates the emergency operation control when the independent supply unit confirms a standby for the power supply of the output stage unit(s) using the emission of the status signal, and the standby signal of the control unit is emitted and these signals are received by the coordination control. Consequently, the emergency operation control mechanism is only deactivated if both signals signal that the standby for taking over the power supply by the independent supply unit and the standby signal of the control unit for taking over the actuation of the output stage control are present.

In another refinement of the present invention, at least one emergency operation supply, assigned to the output stage unit(s), is provided for generating supply power for the output stage unit(s) from the power supply network. The emergency operation supply is designed to be able to be turned on and off. Furthermore, at least one coordination control assigned to the output stage unit(s) is provided, which coordinates the switching on and/or off of the emergency operation supply as a function of a status signal of the independent supply unit and of a standby signal of the control unit.

In the emergency operation, the energy supply of the output stage units takes place via the emergency operation supplies, the latter generating the required power from the energy supply network. The coordination control coordinates the switching on and/or off of the emergency operation control as a function of the status signal of the independent supply unit and the standby signal of the control unit.

Thus, because of the providing of at least one emergency operation supply, that is able to be turned on and off, assigned to the output stage unit(s), it is advantageously assured that, at any time, especially the output stages of the inverter, in a secure operating state, are able to be switched, for instance, into a short circuit operation, even if the voltage supply, using the independent supply unit, is not available. During the turn-on transient or the turn-off transient of the inverter, or even in case of a malfunction of the control unit and/or the supply unit of the inverter, particularly overvoltages in the power supply network, which could lead to permanent damage of the output stages, may thus be avoided. Since the emergency supply is designed to be able to be switched on and off, switching over may be accomplished from emergency operation back to normal operation using the coordination control, as a function of the status signal of the independent supply unit and a standby signal of the control unit.

In one further refinement of the present invention, it is provided that the coordination control switches off the emergency operation control when the independent supply unit confirms a standby for the power supply of the output stage unit(s) using the emission of the status signal, and the standby signal of the control unit is emitted and these signals are received by the coordination control. Consequently, the emergency operation supply is only switched off if both signals signal that the standby for taking over the power supply by the independent supply unit and the standby signal of the control unit for taking over the actuation of the output stage control are present.

In still another refinement of the present invention, it is provided that the inverter has at least one potential transmitter and the status signal of the independent supply unit and the standby signal of the control unit are modulated upon the supply voltage, and are thus transmitted via the potential transmitter to the output stage unit(s). The technical background of this embodiment is that, in the case of inverters of higher power and therefore high currents and voltages, the control electronics and the output stage unit(s) are electrically separate, that is, are not galvanically connected to one another. In order for the output stage unit(s) to be able to be developed free of potential, both the supply voltage and the control signals have to be transmitted into the output stage unit(s). For the voltage supply of the output stage unit(s), an alternating voltage is therefore generated as supply voltage outside the output stage unit(s), which is transmitted into the output stage units using at least one potential transmitter, for instance, a transformer. The alternating voltage produced on the secondary side of the potential transmitter is rectified, and thus the potential-free supply voltage is generated for the output stage unit(s).

Using this potential transmitter, the control signals are also transmitted into the output stage unit(s), by being modulated upon the alternating voltage on the primary side of the potential transmitter, and demodulated on the secondary side of the potential transmitter in a signal detection unit and reconstructed, and emitted again as a control signal. The modulation of the control signals upon the alternating voltage may take place in different ways. For example, it may take place as a change in the frequency, as a change in the pulse duty factor, as a change in the amplitude of the alternating voltage or as a signal modulated upon. The potential transmitters may particularly be used for transmitting control signals even bidirectionally, that is, within the inverter into the output stage unit, but also in reverse. According to this refinement, both signals are thus modulated upon the supply voltage and, using the potential transmitter, these two signals are also transmitted into the output stage unit(s). Consequently, an additional transmitting connection within the inverter and into the output stage unit(s), for transmitting the two signals, is not required. As a result, installation space and additional component parts are advantageously saved.

According to the method according to the present invention, for operating an inverter for an electric machine, the inverter having at least one output stage unit for producing a connection between the electric machine and a power supply network, in normal operation, the output stage unit(s) is(are) supplied with power via a supply unit that is independent of the power supply network, and controlled via a control unit. In emergency operation, which is activated particularly during the turn-on transient or the turn-off transient of the inverter or even upon a malfunction of the control unit and/or the supply unit of the inverter, the output stage unit(s) is/are controlled by at least one emergency operation control in such a way that switching elements within the output stage unit are switched to a short circuit operation. Furthermore, the inverter has a coordination control assigned to the output stage unit(s) which coordinates the activation or the deactivation of the emergency operation control mechanism. The coordination control activates or deactivates the emergency operation control as a function of the status signal of the independent supply unit and a standby signal of the control unit.

In one further refinement of the present invention, it is provided that the coordination control deactivates the emergency operation control when the independent supply unit confirms a standby for the power supply of the output stage unit(s) using the emission of the status signal, and a standby signal of the control unit is emitted and these signals are received by the coordination control.

According to a further refinement of the method according to the present invention for operating an inverter for an electric machine, in emergency operation, which is activated particularly during the turn-on transient or the turn-off transient of the inverter, but also at a malfunction of the control unit and/or the supply unit of the inverter, by at least one emergency operation supply, power is generated for the power supply of the output stage unit(s) from the power supply network. Furthermore, the inverter has a coordination control assigned to the output stage unit(s) which coordinates the switching on or off of the emergency operation supply. The coordination control switches the emergency operation supply on or off as a function of the status signal of the independent supply unit and a standby signal of the control unit.

In one further refinement of the present invention, it is provided that the coordination control switches off the emergency operation supply when the independent supply unit confirms a standby for the power supply of the output stage unit(s) using the emission of the status signal, and a standby signal of the control unit is emitted and these signals are received by the coordination control.

Further features and advantages of exemplary embodiments of the present invention are described in the following with reference to the accompanying drawings.

DETAILED DESCRIPTION

Figure 1:
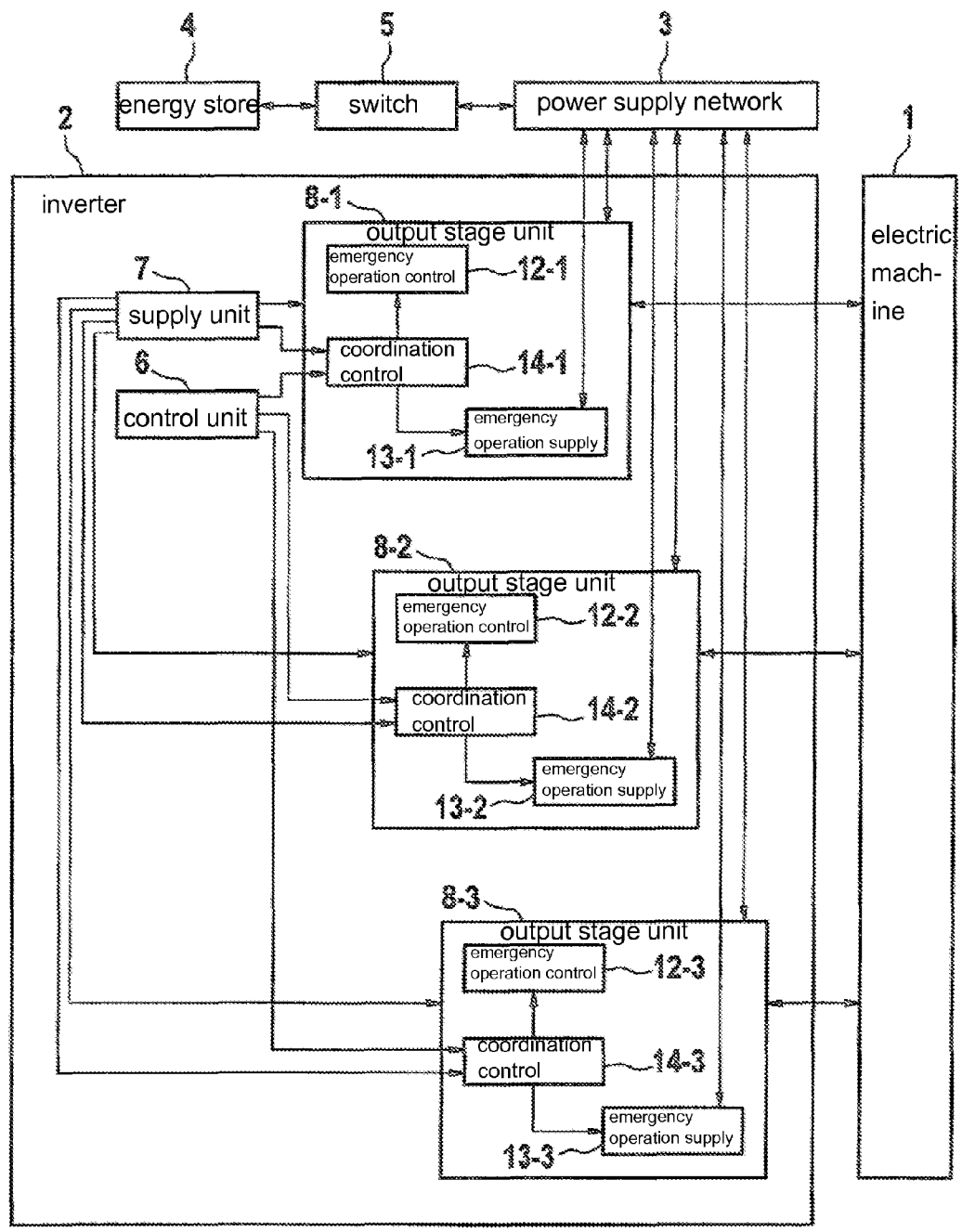
FIG. 1 illustrates a schematic block diagram of an inverter.

FIG. 1 shows an electric machine 1 which is connected via an inverter 2 to a power supply network 3 which, for example, may be designed as a high voltage traction network in a hybrid vehicle. When electric machine 1 is operated in motor operation, it is supplied with power from power supply network 3. During operation in generator operation, the electric machine is, in reverse, able to feed electric power into power supply network 3. Power supply network 3 is connected to an energy store 4, for instance, a battery. Power supply network 3, especially when detecting a fault function within the electrical network, is able to be separated from energy store 4 via a switch 5. Inverter 2 has a control unit 6, a supply unit 7 as well as one or more output stage units 8. In this exemplary embodiment, for each phase of electric machine 1, in each case an output stage device 8 is provided. In the example shown, a three-phase electric machine is assumed, so that three output stage units 8-1, 8-2 and 8-3 are provided. As a function of the embodiment and assignment to output stage unit(s) 8 per phase and of the number of phases of electric machine 1, however, more or fewer than three output stage units may also be provided.

Supply unit 7 is used for the power supply of output stage units 8-1, 8-2 and 8-3. It is executed independently of power supply network 3 and is fed via the low voltage vehicle electrical system of a hybrid vehicle. The control of output stage units 8-1, 8-2 and 8-3 takes place via control unit 6.

Output stage units 8 each have an output stage 9, for instance, in the form of a power semiconductor circuit, and an output stage control 10. From control unit 6, output stage controls 10 each receive control specifications which are then converted to suitable control signals for controlling output stages 9.

In order to keep output stage units 8 ready for operation even in case of a faulty actuation by control unit 6 or insufficient power supply by supply unit 7, that is, during the turn-on transient or the turn-off transient of inverter 2, or even in the case of a malfunction of control unit 6 and/or supply unit 7 of the inverter, and securely to prevent overvoltages on power supply network 3, an emergency operation control 12, an emergency operation supply 13 and a coordination control 14 are provided in each output stage unit 8. Coordination control 14 controls the operation of emergency operation control 12 and emergency operation supply 13, as well as the switching over to normal operation during switching on and off of inverter 2, or in the case of a malfunction. In this context, the control specifications for output stage controllers 10, and thus the control of output stage units 8 are taken over by respective emergency operation control 12 in such a way that the switching elements within output stage 9 are switched to a short circuit operation. The power supply for output stage units 8 takes place, in emergency operation, via emergency operation supplies 13, the latter generating the required power from power supply network 3.

In the exemplary embodiment shown, for each output stage unit 8-1 to 8-3 is provided in each case with its own coordination control 14-1 to 14-3, an emergency operation control 12-1 to 12-3 and an emergency operation supply 13-1 to 13-3. Alternatively, however, one or more coordination controls 14, one or more emergency operation controls 12 and/or more emergency operation supplies 13 may be provided, which are assigned to all, or at least to a plurality of output stage units 8. It is only decisive that to each output stage unit 8 that is present and utilized, a coordination control 14, an emergency operation control 12 and an emergency operation supply 13 be assigned, so that in the fault case, a control and a power supply of output stage unit 8, that are independent of control unit 6 and supply unit 7, are ensured.

Since, during the emergency operation, that is, in the fault case, no frequent switching of output stages 9 is required, it is also not necessary to provide a large recharging current by emergency operation supply 13. The latter may consequently be designed for small power losses.

Figure 2:
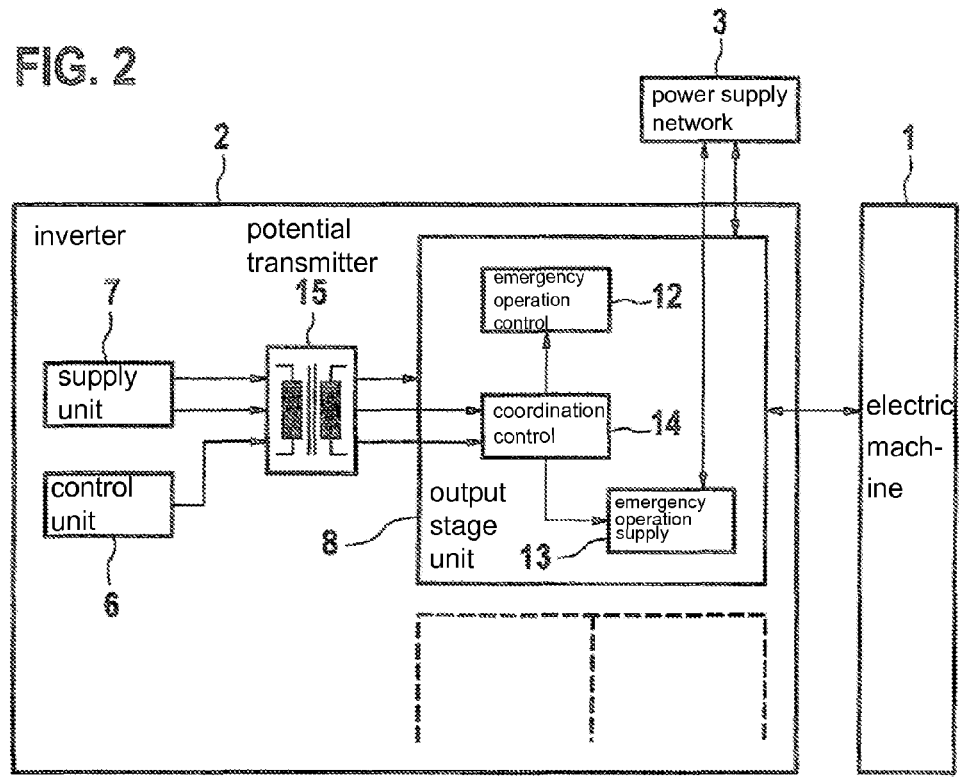
FIG. 2 illustrates a schematic representation of a cutout of an exemplary embodiment of an inverter according to the present invention having a potential transmitter.

FIG. 2 schematically shows a cutout of an embodiment of a circuit for implementing the inverter according to the present invention, having a potential transmitter 15. Output stage unit 8 includes coordination control 14, which receives two input signals. These are a status signal of independent supply unit 7 and a standby signal of control unit 6. These two signals are transmitted free of potential to coordination control 14. For this, the signals are modulated upon the supply voltage that is to be transmitted, using potential transmitter 15, to output stage unit 8 and subsequently conveyed to coordination control 14 after a demodulation. In coordination control 14, the signals are checked and evaluated. As a function of the evaluation, emergency operation supply 13 is switched on or off and emergency operation control 12 is activated or deactivated.

Figure 3:
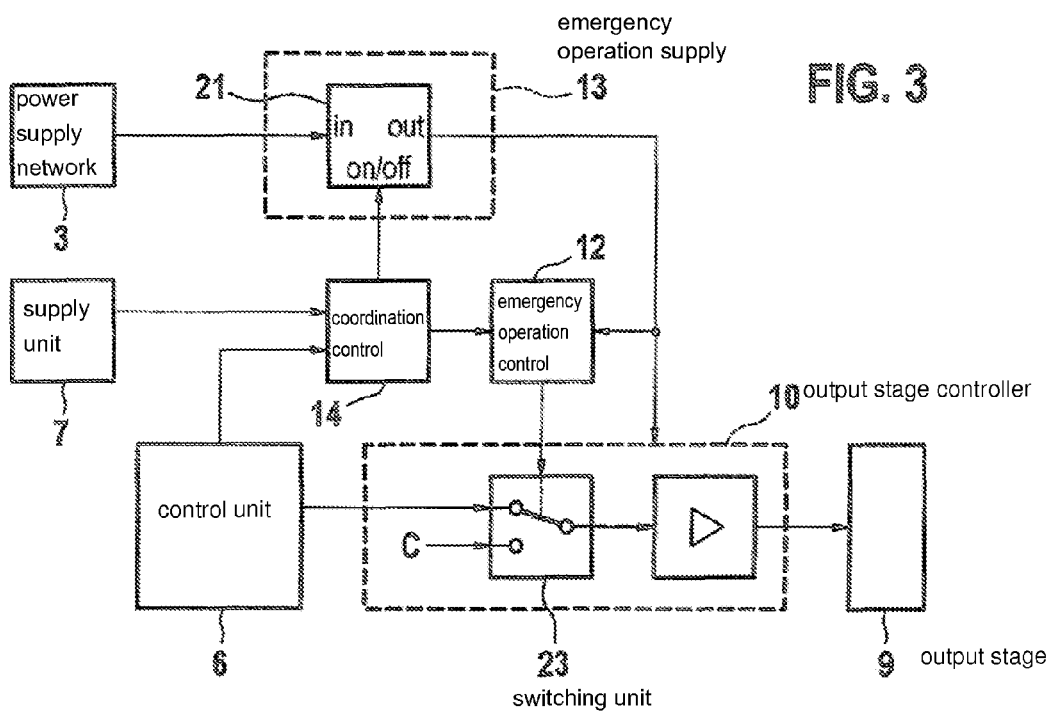
FIG. 3 illustrates a schematic representation of a circuit device for carrying out the method according to the present invention.

FIG. 3 shows schematically an exemplary circuit for implementing the method according to the present invention. In this context, coordination control 14 receives two input signals, the status signal of independent supply unit 7 and the standby signal of control unit 6. When the status signal, which confirms a standby of independent supply unit 7 for the power supply of the output stage unit(s), and the standby signal of control unit 6 is received by coordination control 14, emergency operation control 12 is deactivated and emergency operation supply 13 is switched off. As soon as one of the signals is not able to be received, emergency operation control 12 is activated and emergency operation supply 13 is switched on using coordination control 14. Emergency operation supply 13 thus produces power from power supply network 3, and using emergency operation control 13, a switching unit 23 is operated that is provided in output stage controller 10. This results in output stage 9 now no longer being controlled via a control signal specified by control unit 6, but via an emergency operation control signal C, which has the result, for example, that the low-side switching element(s) are switched conductively within output stage 9. If this control is used for all present and utilized output stage units 8, a short-circuit operation of inverter 2 is implemented, which certainly prevents an overvoltage in power supply network 3 and, with that, prevents permanent damage to output stages 9.

In addition, the current flow through the output stages may also be monitored, and upon the diagnosis of an overcurrent, switching to a short-circuit operation may first of all not be made admissible at all, or a short-circuit operation that has already begun is able to be broken off. In this way, damaging of the output stages by overcurrents may also be prevented.

What is claimed is:

1. An inverter for an electric machine, comprising:
    at least one output stage unit for producing a connection between the electric machine and a power supply network;
    a control unit for controlling the at least one output stage unit;
    a supply unit, that is independent of the power supply network, for power supply of the output stage unit; and
    at least one emergency operation control, assigned to the output stage unit, for controlling the output stage unit such that switching elements within the output stage unit are switched into a short circuit operation;
    wherein the output stage unit has a coordination control, and the coordination control activates or deactivates the emergency operation control as a function of a status signal of the independent supply unit and of a standby signal of the control unit.

2. The inverter according to claim 1, wherein the coordination control deactivates the emergency operation control when the independent supply unit confirms a standby for the power supply of the output stage unit using emission of the status signal, and the standby signal of the control unit is emitted, the status and standby signals being received by the coordination control.

3. The inverter according to claim 1, wherein the inverter has at least one emergency operation supply assigned to the output stage unit for generating supply power for the output stage unit from the power supply network and the coordination control switches on or off the emergency operation supply as a function of the status signal of the independent supply unit and of the standby signal of the control unit.

4. The inverter according to claim 3, wherein the coordination control switches off the emergency operation supply when the independent supply unit confirms a standby for the power supply of the output stage unit using emission of the status signal, and the standby signal of the control unit is emitted, the status and standby signals being received by the coordination control.

5. The inverter according to claim 1, wherein the inverter has a potential transmitter for transmitting a supply voltage from the independent supply unit into the output stage unit, and the status signal of the independent supply unit and the standby signal of the control unit are modulated upon the supply voltage and are transmitted into the output stage unit using the potential transmitter.

6. A method for operating an inverter for an electric machine, the inverter having at least one output stage unit for producing a connection between the electric machine and a power supply network, the method comprising:
    in normal operation, supplying the output stage unit with power via a supply unit that is independent of the power supply network, and controlling the output stage unit via a control unit; and
    activating or deactivating an emergency operation control of the output stage unit via a coordination control as a function of a status signal of the independent supply unit and of a standby signal of the control unit, and controlling the output stage unit via the emergency operation control such that switching elements inside the output stage unit are switched into a short circuit operation.

7. The method according to claim 6, wherein the coordination control deactivates the emergency operation control when the independent supply unit confirms a standby for the power supply of the output stage unit using emission of the status signal, and the standby signal of the control unit is emitted, the status and standby signals being received by the coordination control.

8. The method according to claim 6, further comprising:
    generating power for the power supply of the output stage unit via an emergency operation supply from the power supply network; and
    switching on or off the emergency operation supply via the coordination control as a function of the status signal of the independent supply unit and of the standby signal of the control unit.

9. The method according to claim 8, wherein the coordination control switches off the emergency operation supply when the independent supply unit confirms a standby for the power supply of the output stage unit using emission of the status signal, and the standby signal of the control unit is emitted, the status and standby signals being received by the coordination control.

10. The method according to claim 6, wherein the emergency operation control controls the respective output stage unit such that an overcurrent in an output stage is prevented.

11. The method according to claim 10, wherein, in response to a diagnosis of an overcurrent, the switching into the short circuit operation is not prevented or the short circuit operation is broken off.

* * * * *